BEST AVAILABLE COPY

W. E. Prall.

Cotton Harvester.

No. 2424

Reissued. Dec. 18. 1866.

Wm. E. Hibbard
N. G. Lombard } Witnesses.

W. E. Prall Invent

United States Patent Office.

IMPROVEMENT IN MACHINE FOR PICKING COTTON.

WILLIAM E. PRALL, OF WASHINGTON, DISTRICT OF COLUMBIA.

*Letters Patent No.* 52,880, *dated February* 27, 1866; *reissue No.* 2,424, *dated December* 18, 1866.

The Schedule referred to in these Letters Patent and making part of the same.

TO ALL WHOM IT MAY CONCERN:

Be it known that I, WILLIAM E. PRALL, formerly of Knoxville, in the county of Knox, and State of Tennessee, but now residing in Washington, in the District of Columbia, have invented a new and useful Machine for Harvesting or Gathering Cotton from the plant; and I do hereby declare that the following is a full, clear, and exact description of the construction and operation thereof, taken in connection with the accompanying drawings, making a part of this specification, in which—

Figure 1:
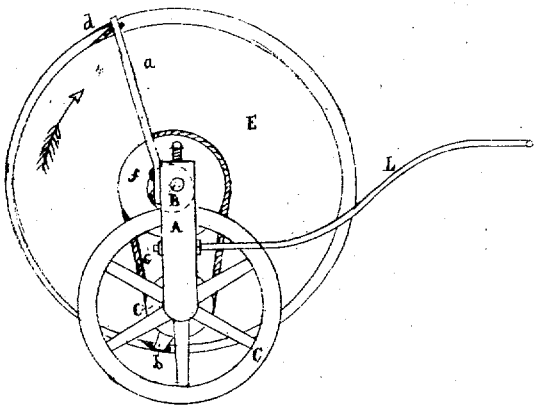
Figure 1 is a side elevation of the machine.

The subject-matter of my invention is a machine for picking or gathering cotton from the plant, by being drawn along over the rows in which it is grown in the field.

The principal parts which compose this machine are—

First. Two series of devices called picking cylinders, which are carried upward through and among the branches of the plant, at either side of the row, by which the cotton that protrudes from the bolls is seized and drawn therefrom, and carried out of the plant to a convenient position to be discharged.

Second. A mechanism by which each series of picking devices is applied to the plant and operated.

Third. A mechanism for taking the cotton from the picking devices and discharging it into a proper receptacle.

Fourth. A receptacle for the picked cotton.

Fifth. A means of arranging the operative mechanism upon an elevated frame, which will pass over the tops of the plants without materially bending them, combined with carrying-wheels, which support the machine and impart motion to its operative parts; and Sixth. A means of attaching draught animals thereto to operate the machine.

These general parts of mechanism, when combined and arranged in a manner to be described, constitute a new machine and embody a new mode of operation, by which the cotton is automatically and continuously gathered from the plant in a condition ready for the subsequent operations.

As regards the subordinate parts of which this machine is composed, my invention relates, in the first place, to the device by which the cotton is gathered from the plant, and consists in the employment of a small revolving cylinder, which I call a picking cylinder, which is inserted among the branches of the plant, and whose surface is covered with small teeth or points, or some other covering similar in its action, that will seize the exposed fibres of the cotton with which it comes in contact, and wind the same upon its surface, and draw the cotton from the bolls, and retain the cotton while said device is carried through the plant among its branches.

My invention relates, in the second place, to the manner of applying said device to the picking or gathering of cotton, and consists in the employment of two series of picking cylinders, one upon either side of the row of cotton plants, each series being composed of an endless succession of said cylinders placed near each other and supported by their outer ends, with their inner ends left free to enter among the branches of the plant and gather the cotton, and each series also having a movement that will carry the cylinders upward through the plant, and a progressive movement in the direction of the row of plants, so that the path of each cylinder through the plant shall be a little in advance of the preceding one; and also in combining with each series a suitable mechanism that will give to said cylinders a rotative motion while passing through the plant, and relieve them from it after they have passed through and are in the proper position to have the cotton removed therefrom.

My invention relates, in the third place, to the mechanism for removing the cotton from the picking cylinders after it has been carried up out of the plant, and consists in the employment, in combination with each series of cylinders, as before described, of a series of stationary toothed plates, called toothed arcs, the breadth of the series being nearly equal to the length of the operative parts of the cylinders, and the teeth of which project in a direction opposite to the motion of the series of cylinders. These plates are so placed that the peripheries of the cylinders come close to their toothed edges as they pass by, and they serve to seize the cotton upon the cylinders and retain it, causing the cylinders to revolve in an opposite direction to that by which the cotton was wound upon them, and thus unwind and deposit the cotton upon the arcs.

My invention relates, in the fourth place, to the mechanism by which the cotton is removed from the toothed arcs, before mentioned, as fast as it is deposited thereon by the cylinders, and consists in combining with the series of toothed arcs a clearing-wheel, so called, provided with radial arms or spokes, which pass between said arcs to their toothed edges, or a little beyond, and the extremities of which revolve in a direction opposite to that in which the series of cylinders move, so that the cotton will be continuously wiped or raked therefrom and allowed to fall into the receptacle provided to receive it.

My invention relates, in the fifth place, to the manner of constructing the mechanism by which the series of picking cylinders are applied to and carried through the plant in succession, and also to the mechanism by which the several movements of the picking apparatus are produced, and consists in arranging each series of cylinders upon the face of a large wheel near its periphery, said cylinders being supported by one end only, with their free ends projecting inward toward the other wheel; also in arranging said wheels diagonally to each other in a horizontal direction, so that at their forward sides the cylinders upon said wheels passing downward will be a sufficient distance apart to receive the plant between them, and at the rear sides the cylinders will approach near those of the opposite series while passing up through the plant and gathering the cotton; also in combining with each wheel and its series of cylinders, a stationary band, working on pulleys on said cylinders, or some other equivalent means, by which the cylinders will be rotated while in the plant and relieved from rotation before the cotton is to be removed therefrom, and also in so combining and arranging the said wheels and the carrying-wheels of the machine, as that they will receive from said carrying-wheels a proper rotary motion as the machine is drawn along, as will hereafter be more particularly described.

My invention relates, in the sixth place, to the manner of constructing and arranging the receptacle for the picked cotton, in relation to the wheels which carry the picking cylinders, and to the mechanism that removes the cotton therefrom, and consists in arranging said receptacle between said wheels in a fixed position above the axis of the same, and within the orbit of movement of the picking cylinders, and below the mechanism by which the cotton is removed therefrom, so as to receive the picked cotton as it is delivered and carry it along with the machine.

My invention relates, in the seventh place, to the manner of combining and arranging the several parts before mentioned to enable the machine to pass over the plants without bending them down so as to interfere materially with the gathering of the cotton, and consists in placing the cross-connections of the framing of the machine at about the height of the centre of the wheels which carry the picking cylinders, and extending the framing downwards upon either side of the machine to receive the carrying-wheels, and arranging the other parts in connection therewith, so as to leave a central open space through which the plants can pass without bending them materially from their erect position.

And lastly, my invention consists in combining with the framing of the machine, constructed substantially as before described, a tongue or pole, by means of which horses or other animals may be harnessed thereto to draw the machine along and maintain it in an erect position.

Figure 4:
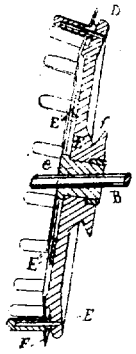
Figure 4 is a section through the centre of one of the wheels that carry the picking cylinders.
Figure 5:
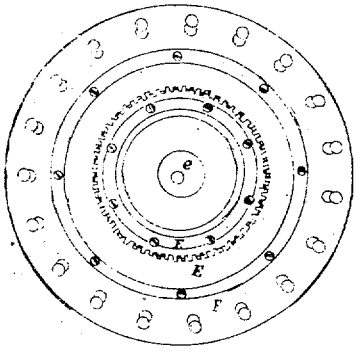
Figure 5 is an elevation of the inner face of the same.
Figure 2:
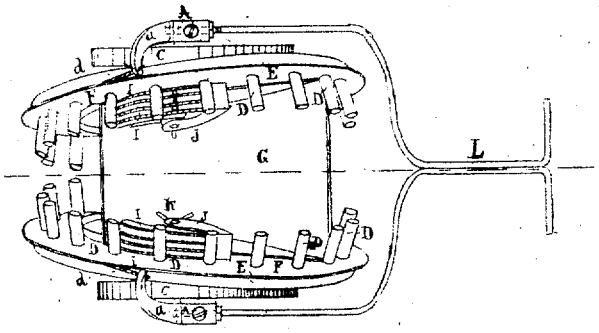
Figure 2 is a plan.
Figure 3:
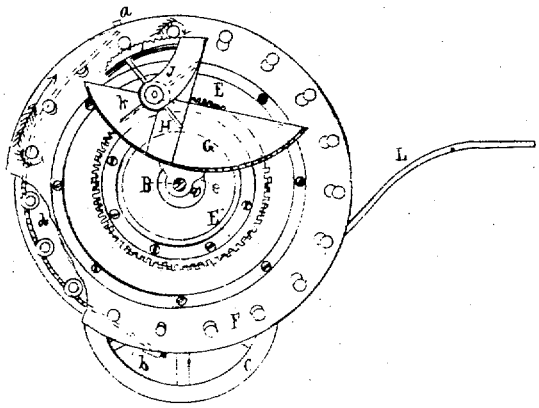
Figure 3 is a longitudinal sectional elevation, on line *x* of fig. 2.
Figure 7:
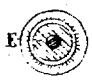
Figures 6 and 7 are details of one of the picking cylinders.
Figure 6:
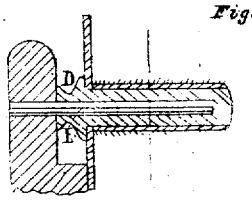

In the drawings, A A represent two upright standards, which are firmly secured at the top to the cross-connection or axle, B, at either end thereof, which together compose the framework upon which the operative parts of the machine are arranged. The lower end of each standard is provided with a fixed axle, upon which the carrying-wheels, C C, work, which support the machine and give motion to its operative parts. D D, &c., are the devices for gathering the cotton, which I call the "picking cylinders." They are arranged upon the inner faces of the wheels, E E, around the circumference, as shown, and revolve upon spindles or studs, E′, fixed in the wheels E. Upon the end of each cylinder D, next the wheel E, is formed a grooved pulley, D′, by which the cylinder is rotated, as will be described. The remaining portion of the cylinder projects through the guard plate, F, which is secured to the wheel E as shown, and serves to protect the pulley and belt, *d*, from being entangled by the winding on of the loose cotton. That part of the cylinder D that projects beyond the guard plate F is covered with short teeth or points made of metal, or it may be made like a round brush with very short bristles, or it may be made with any other similar covering that will seize the fibres of the cotton that is brought in contact with it, and wind the cotton upon its surface as it revolves, and deliver the cotton freely when it is unwound. The construction of the cylinders and parts adjacent thereto is shown on a larger scale in figs. 6 and 7. A rotary motion is given to the cylinders during a portion of the revolution of the wheel E, by means of the stationary belt *d*, which is stretched from the top of the arm, *a*, which is fastened to the top of the standard A, to the arm *b*, which is fixed upon the inner end of the axle of the carrying-wheel. This belt works in the grooved pulleys of the cylinders, in the space between the wheel E and its guard plate F, as is seen more clearly in fig. 3. The wheels E are set diagonally to each other upon the cross-connection B, by means of the oblique bearings, *e*, which are fixed upon the same, as seen in fig. 4, so that at the forward edges of the wheels they are at considerable distance apart, to enable the cylinders upon the two wheels to pass down outside of the plants and approach each other as they rise through the plants, as is seen in fig. 2. The point of nearest approach of the cylinders may be adjusted by adjusting the positions of the bearings *e* around the axle B. The wheels E receive their revolution from the bearing-wheels C, by means of the pulley, *c*, on the same, and the belt, *c′*, and pulley, *f*, on the wheel E, in an obvious manner. The relative sizes of the pulleys *c* and *f* are made such as to cause each cylinder D to move nearly in a cycloid, but this may be modified if desired. G is the receptacle or trough for the cotton. It is made of the form shown in figs. 2 and 3, being fixed upon the cross-connection B, and lying within the series of picking cylinders. The sides of the trough are made to come close to the inner faces of the wheels E, and upon the same are fastened the brackets, H, which extend nearly up to the picking cylinders, and upon which the series of toothed plates, I I, &c., are arranged, and also the hangers, J J, which support the clearing-wheels, *k k*. The plates I I, I call the "toothed arcs." They are made with their outer edges curved, to conform to the circle described by the inner surfaces of the picking cylinders, and placed near the same, as shown, and arranged side by side, with a space between each two, and in number sufficient to make a breadth about equal to the length of that part of the cylinder that projects beyond the guard plate. Their outer edges are provided with hooked teeth, which point in a direction opposite to that in which the wheel E moves. The clearing-wheels *k k* are made with a central hub, *l*, with long pins or teeth set radially therein, of such size and at such distance apart as to pass freely between the several toothed arcs to their outer surface or a little beyond. They are made to rotate in a direction opposite to the wheels E by means of pinions on the outer ends of their shafts working into the gears, E″, which are secured to the wheels E, as is seen in fig. 3. L is the tongue or pole by which the machine is drawn and managed and in part supported, and is intended to be used with horses or other animals harnessed thereto a sufficient distance apart to permit them to walk each side of the row of cotton plants while the pole passes over them.

The operation of this machine is as follows: The machine, drawn by a span of horses harnessed as described, commences at one end of a row of cotton plants, and being drawn along astride of it, the plants enter freely at the front, between the wheels E and their cylinders, and their branches are somewhat compressed together as they pass out at the rear. The rotation of the carrying-wheels C, by means of the pulley and belt described, imparts motion to the wheels E, and by that means causes the picking cylinders D to first pass down below the branches of the plant and gradually close together, so that the cylinders are inserted among the branches and then raised up among them. While the cylinders are rising and are among the branches they are made to rotate by passing under the stationary belt *d*, which causes them to seize the cotton that protrudes from the bolls with which they come in contact, and by winding it on to their surfaces draw it from the boll, and also retain it there, by their rotation, against the liability of its being removed by passing among the branches, until it is carried up out of the plant. The cylinders thus loaded, more or less, with cotton, after leaving the fixed belt, pass over the toothed arcs I, the teeth of which seize the cotton and retain it, causing the cylinders to revolve in an opposite direction and unwind the locks of cotton from their surfaces, leaving it upon the toothed arcs, from which it is continuously removed by the arms or pins of the clearing-wheel and deposited in the trough G. From this the cotton is removed and put in small bags, by an attendant riding on the front of the machine, in which it is carried to the gin house.

It is obvious that the form and construction of the mechanism by which this mode of operation is embodied may be considerably varied without departing from the principle thereof; as, for instance, the series of picking cylinders may be attached to an endless chain, so arranged that they will pass down clear of the plant and upward through it, with a rotative motion of the cylinders to gather and transfer the cotton, as before described. And again, the machine may be made single, with one series only of cylinders, and work on one side only of the row of cotton plants at a time, being drawn along by the side of the row; and other modifications of a like nature may be made; but the machine here shown is the form which I deemed best, and I have therefore shown it as an embodiment of my invention.

Having thus described my invention, what I claim as new, and desire to secure by Letters Patent, is as follows:

1. I claim a machine for harvesting cotton, constructed and operating substantially as described.

2. In a machine for harvesting cotton, I claim the revolving picking cylinder as a device for gathering the cotton among the branches of the plant, constructed and operating substantially as described.

3. I claim, in a cotton-harvesting machine, the employment of one or more continuous series of said picking cylinders, so arranged as to be made to pass in close succession through the plant to gather the cotton, as described, and also to move progressively along the row of plants, so as to operate on all parts thereof, substantially as described.

4. I claim the combination and arrangement of a continuous series of picking cylinders projecting from the face of a wheel set at an angle to the line of progression of the machine, or its equivalent, so that in their downward movement the picking cylinders shall pass outside of the plant, then beneath its branches, and up through and among the same, substantially as described.

5. I claim the combination, with a series of revolving picking cylinders arranged upon a wheel or its equivalent, as described, of a stationary band, or other equivalent mechanism, that will rotate said cylinders, substantially as described.

6. I claim the combination of the wheel E and its series of picking cylinders, or the series arranged in a manner equivalent thereto, with the carrying-wheel C of the machine, so that the picking cylinders shall automatically and simultaneously receive therefrom a rotative movement, as described, and an upward movement through the cotton plant, and a progressive movement along the row of plants, substantially as described.

7. I claim, in combination with the series of picking cylinders, arranged as described, the series of toothed arcs and the clearing-wheel, or their equivalents, for removing the cotton from the cylinders, substantially as described.

8. I claim the employment, in combination, of two systems of mechanism for gathering and discharging the cotton, constructed, arranged, and operating substantially as described, and set diagonally face to face, so as to operate simultaneously upon opposite sides of the plant, substantially in the manner described.

9. I claim the trough or receptacle for the cotton, placed above the cross-connection of the machine and within the series of picking cylinders, so as to receive the cotton as it is removed from the cylinders, substantially as described.

10. I claim the manner of combining and arranging the wheels E with their adjuncts, the framing of the machine, the carrying-wheels, and the tongue or perch, so as to leave an open space lengthwise through the machine below the cross-connections, which enables the machine to pass over the plants without bending them down so as to interfere materially with the gathering of the cotton, substantially as described.

11. I claim combining with the framing and operative parts of the machine, constructed and arranged as described, a tongue or perch, to which animals may be harnessed in the manner before described, to draw the machine along and maintain it in an erect position.

Executed at Boston this 31st day of October, 1866.

W. E. PRALL.

Witnesses:

WM. C. HIBBARD,

N. C. LOMBARD.